United States Patent
Bigard

(10) Patent No.: US 10,155,559 B2
(45) Date of Patent: Dec. 18, 2018

(54) BICYCLE FRAME AND ASSOCIATED SEAT POST

(71) Applicant: LOOK CYCLE INTERNATIONAL, Nevers (FR)

(72) Inventor: Pierre Bigard, Meru (FR)

(73) Assignee: LOOK CYCLE INTERNATIONAL, Nevers (FR)

( * ) Notice: Subject to any disclaimer, the term of this patent is extended or adjusted under 35 U.S.C. 154(b) by 0 days.

(21) Appl. No.: 14/574,442

(22) Filed: Dec. 18, 2014

(65) Prior Publication Data

US 2015/0298760 A1 Oct. 22, 2015

(30) Foreign Application Priority Data

Apr. 18, 2014 (FR) ...................... 14 53533

(51) Int. Cl.
*B62K 19/36* (2006.01)

(52) U.S. Cl.
CPC .................................. *B62K 19/36* (2013.01)

(58) Field of Classification Search
CPC .. B62K 19/36; B62K 19/24; B62J 1/00; B62J 1/08
USPC ................................ 280/281.1, 287, 288.4
See application file for complete search history.

(56) References Cited

U.S. PATENT DOCUMENTS

| | | | | |
|---|---|---|---|---|
| 5,803,476 | A * | 9/1998 | Olson et al. | 280/281.1 |
| 7,125,030 | B2 * | 10/2006 | D'Aluisio et al. | 280/283 |
| 7,997,645 | B2 * | 8/2011 | Tseng | 297/215.15 |
| 2008/0258517 | A1 * | 10/2008 | Julliard et al. | 297/215.13 |
| 2009/0121451 | A1 * | 5/2009 | Chiang | 280/288.4 |
| 2009/0146471 | A1 * | 6/2009 | Biro | 297/215.13 |
| 2010/0237668 | A1 | 9/2010 | Tseng | |
| 2011/0042543 | A1 * | 2/2011 | Tseng | 248/503.1 |
| 2012/0181824 | A1 * | 7/2012 | Hsu et al. | 297/215.15 |
| 2014/0252745 | A1 * | 9/2014 | Soucek | 280/281.1 |
| 2015/0069734 | A1 * | 3/2015 | Yu | 280/283 |

FOREIGN PATENT DOCUMENTS

| | | |
|---|---|---|
| CN | 101171168 | 4/2008 |
| CN | 201105778 | 8/2008 |
| CN | 201494543 U | 6/2010 |
| CN | 203497067 | 3/2014 |
| DE | 202007015382 U1 | 1/2008 |
| EP | 1877299 B1 | 6/2009 |
| WO | 2006120311 A1 | 11/2006 |

OTHER PUBLICATIONS

French Search Report, dated Jul. 14, 2014, from corresponding French application.
Chinese Office Action dated Jun. 21, 2018.

* cited by examiner

*Primary Examiner* — Jacob D Knutson

(74) *Attorney, Agent, or Firm* — IPsilon USA, LLP

(57) ABSTRACT

A bicycle frame (1) including a seat tube (10), characterized in that the seat tube (10) includes a high end portion (15) capable of being inserted into a hollow seat post body (20); and an attachment device (4-8) capable of locking the seat post body (20) on the inside in the area of the high end portion (15).

10 Claims, 3 Drawing Sheets

BICYCLE FRAME AND ASSOCIATED SEAT POST

FIELD OF THE INVENTION

The present invention relates in general to the attachment of a bicycle saddle to a seat tube of a bicycle frame.

BACKGROUND OF THE INVENTION

The connection of a saddle to a bicycle frame traditionally takes place using a seat post which carries, at one of its extremities, means for the attachment of the saddle, whereas its opposite extremity is inserted into the seat tube of the bicycle frame. A clamping ring is then utilized in order to retain the seat post in a determined longitudinal position in relation to the seat tube after its insertion and in this way to adjust the height of the saddle.

More recently, solutions have been proposed in order to integrate the seat posts as far as possible with the frame of the bicycle. One of these solutions, as described in particular in document CN201494543U, involves utilizing an intermediate component carrying the saddle and capable of being attached to the outside of the seat tube in the manner of a cap. With this solution, the frame must necessarily be provided with a long seat tube in order for it to be suitable a priori for a maximum number of cyclists. Thus, in order to adjust the height of the saddle, the only solution involves cutting the seat tube of the frame to the desired height.

Another known solution involves creating a system for attaching the saddle directly to the frame, the seat tube serving as a seat post. Here, the frame equipped with the attachment system must be made in a factory and customized for each individual cyclist.

According to another solution, as described in particular in document EP 1 877 299 B1 in the name of the applicant, the seat post is inserted into the seat tube, and an annular shoulder that is provided, either on the internal periphery of the seat tube, or on the external periphery of the seat post, permits the insertion of the seat post for a predetermined length.

All of the preceding solutions that are intended to integrate the seat post offer a certain aesthetic advantage and likewise improve the aerodynamics of the bicycle compared with a traditional seat post.

Nevertheless, adjustment of the height of the saddle when it is adapted to the height of the cyclist can only take place by cutting the seat tube. If the seat tube is cut too short, there is no way of turning back other than by changing the frame in its entirety.

Furthermore, if the owner of the bicycle wishes to sell it second-hand, he will be obliged to find a purchaser of the same height, or possibly shorter. This can constitute a disincentive to purchase the bicycle because of the costs associated with the bicycle frame.

Finally, standard frames have seat tubes which are generally long in the part extending above the top tube of the frame. The storage of the bicycle or its transport, for example in an aircraft, is thus made difficult as a consequence of the space taken up by the frame.

SUMMARY OF THE INVENTION

The object of the present invention is to overcome the limitations of the known solutions by proposing a unique system of attachment with an integral seat post, which allows a bicycle frame with a seat tube having the minimum possible length, in order in particular to facilitate its transport, without necessarily being obliged to recut the seat tube in order to adjust the height of the saddle.

In order to do this, the present invention has as its principal object a frame for a bicycle including a seat tube, including a high end portion capable of being inserted into a hollow seat post body, characterized in that the seat tube includes in addition an attachment device that is capable of locking the hollow seat post body on the inside in the area of the high end portion.

The invention also proposes a seat post, including a hollow seat post body that is capable of receiving a high end portion of a seat tube by insertion, characterized in that the hollow seat post body is capable of being locked on the inside in the area of the high end portion.

According to other possible characterizing features of the bicycle frame:

the frame preferably includes in addition means for retaining the seat post body including an abutment that is capable of cooperating with an abutment surface of the seat post body in order to delimit the length of insertion of the said high end portion into the seat post body;

the abutment may be formed by an annular shoulder extending transversely to the longitudinal axis of the seat tube in the junction area between the seat tube and the high end portion and capable of abutting against a lower extremity of the seat post body;

the frame including in addition a top tube connecting the seat tube to a head tube, the annular shoulder forming an abutment is positioned preferably at the base of the high end portion, substantially as an extension of the longitudinal axis of the top tube;

the seat tube is dimensioned in cross section so that its external surface constitutes a continuation of the external surface of the seat post body;

the attachment device includes a screw, the head of which is accessible from the exterior of the seat tube, and a tangent buffer forming a wedge between the high end portion of the seat tube and the interior of the seat post body when the screw is tightened;

as a variant, the attachment device includes a screw, the head of which is accessible from the exterior of the seat tube, and an elastomer between a plate extending transversely to the interior of the seat post body and the upper part of the high end portion of the seat tube;

a protective cap attached to the rear of the seat tube may be provided in order to conceal the head of the screw;

a joint cover capable of covering the zone of transition between the seat tube and the high end portion may be provided.

According to other possible characterizing features of the seat post:

one lower extremity of the seat post body is capable of abutting against an abutment of the seat tube in order to delimit the length of insertion of the said high end portion into the seat post body;

the seat post includes a saddle attachment device in the upper part that is capable of permitting the interchangeable attachment of a saddle;

the seat post may include one or a plurality of interchangeable spacers interposed by stacking between the saddle attachment device and the seat post body, in order to permit the fine adjustment of the height of the saddle;

at least one of the spacers is made of an elastic material, in particular an elastomer.

BRIEF DESCRIPTION OF THE DRAWINGS

Other characterizing features and advantages of the present invention will be appreciated more clearly from the following description of a plurality of non-restrictive embodiments of the invention, which is made with reference to the figures annexed hereto, in which.

DETAILED DESCRIPTION OF THE INVENTION

In the various figures, identical or equivalent components bear the same reference signs.

Figure 1:
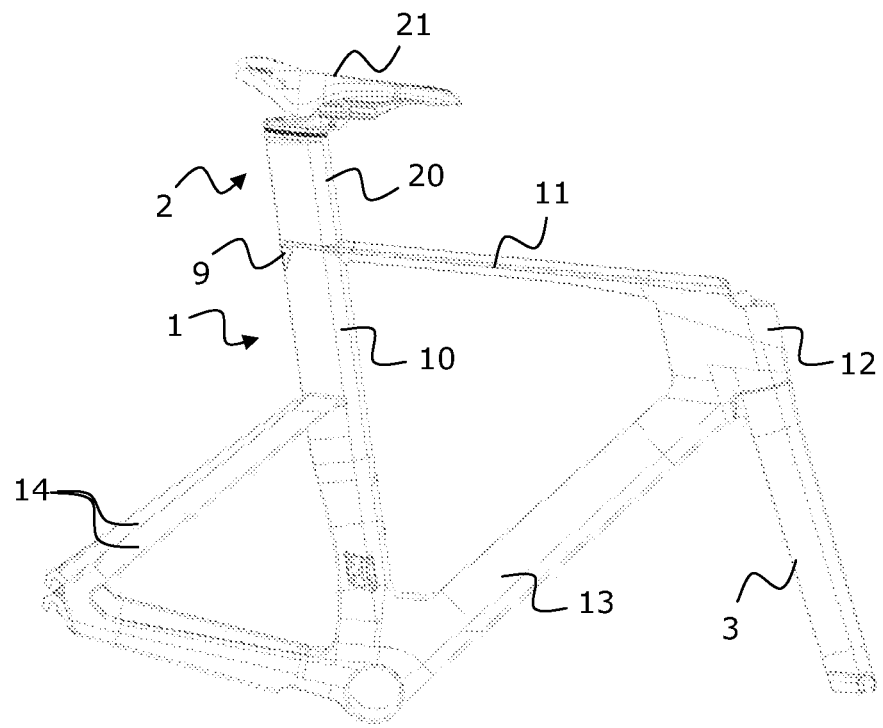
FIG. 1 depicts a seat post mounted on a bicycle frame according to an illustrative embodiment according to the invention.
Figure 2:
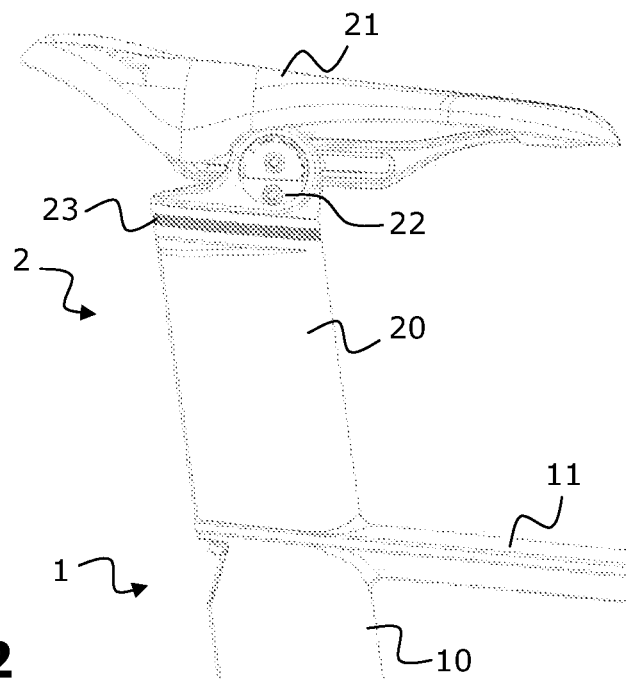
FIG. 2 is a partial, enlarged view of FIG. 1, in the area of the joint of the seat post and the bicycle frame.

FIG. 1 shows an example of a bicycle frame 1 receiving a seat post 2 according to the invention, and a fork 3. The bicycle frame 1 conventionally comprises a seat tube 10 and a top tube 11 connecting the seat tube 10 to a sleeve (or head tube) 12 intended in particular to receive the pivot of the fork 3. The bicycle frame 1 may optionally include an oblique down tube 13 connecting the head tube 12 to a pedal assembly (not illustrated here), and stays 14 connecting the seat tube 10 to the rear wheel spindle. The bicycle frame 1 is preferably produced in the form of an integral component, for example from a composite material.

The seat post 2 conventionally comprises a seat post body 20, to which a saddle 21 is attached by means of an attachment device 22 permitting the inclination of the saddle 21 to be adjusted. The seat post body 20 is likewise preferably produced from a composite material.

Figure 3:
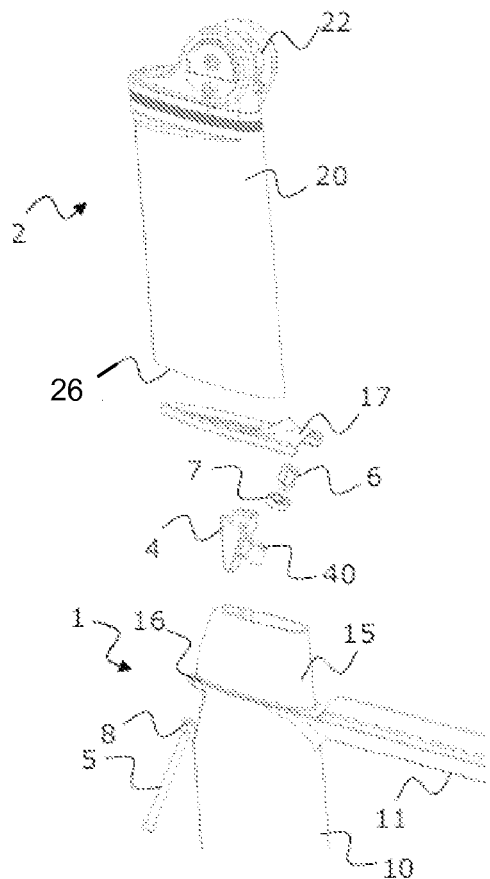
FIG. 3 is a partial, exploded view of the various components of FIG. 2.
Figure 4:
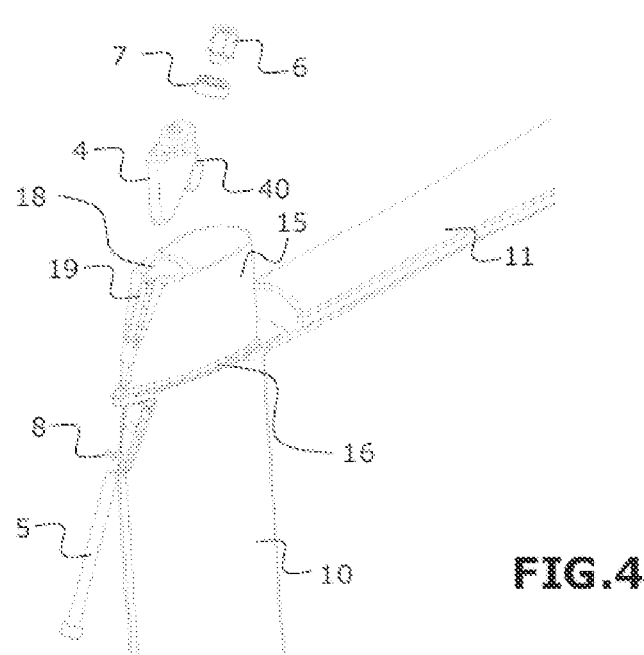
FIG. 4 is a partial, exploded view, in which only the components permitting the attachment of the seat post to the frame are depicted.
Figure 5:
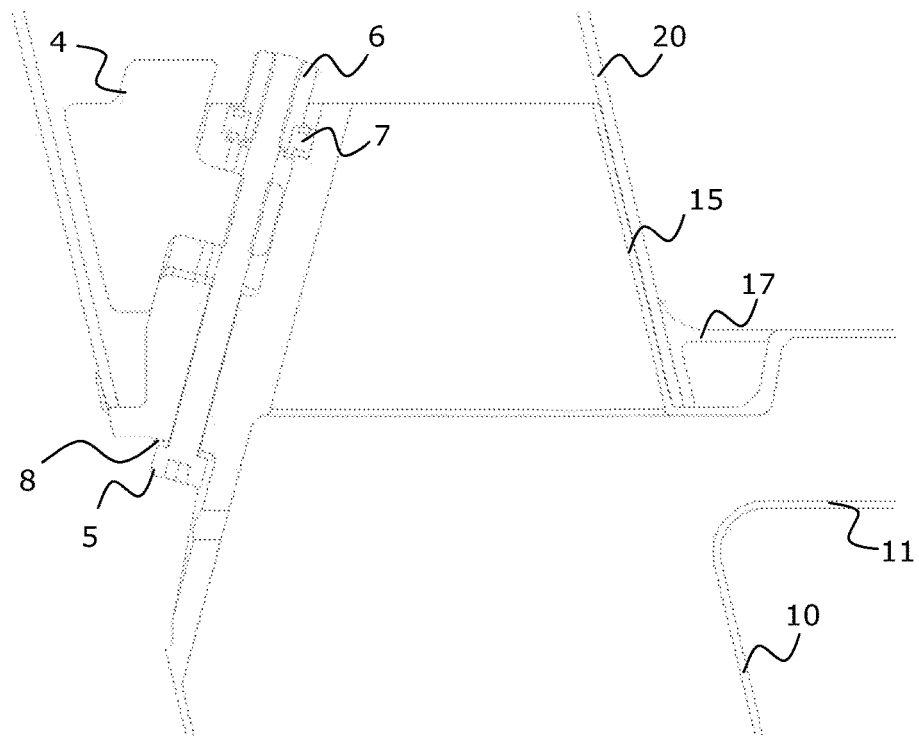
FIG. 5 is a partial view in lateral cross section of the joint of the seat post and the bicycle frame in FIG. 2.

According to the invention, the seat post body 20 is hollow, at least in its lower part, and is capable of receiving by insertion a high end portion 15 of the seat tube 10 (see FIGS. 3 to 5).

The seat post 2 is preferably maintained at a certain height by an abutment 16, for example an annular shoulder extending transversely to the longitudinal axis of the seat tube 10 in the area of the joint between the seat tube 10 and the high end portion 15 (see FIGS. 3 and 4), which is intended to cooperate with an abutment surface of the seat post 2, for example directly with the lower extremity 26 (see FIG. 3) of the seat post body 20. In this way, the length of insertion of the high end portion 15 into the seat post 2 will be limited by this abutment 16.

The annular shoulder forming an abutment 16 is preferably positioned on the base of the high end portion 15, substantially as an extension of the longitudinal axis of the top tube 11.

For aesthetic reasons, the seat tube 10 is dimensioned in cross section so that its external surface follows on from the external surface of the seat post body 20. The high end portion 15 is, of course, of reduced cross section so as to permit its insertion into the seat post body 20.

The seat tube 10 and the high end portion 15 are preferably produced in a single piece, with a section for the high end portion 15 that is tapered in relation to the cross section of the seat tube 10. The abutment 16 is then formed by the transition surface between the seat tube 10 and the high end portion 15. As a variant, the high end portion 15 is carried on the upper part of the seat tube 10. The latter then includes a transverse end surface forming the abutment 16.

A system of anti-rotation is preferably provided in order to prevent the seat post 2 from rotating about the high end portion 15 of the seat tube 10. Here, the anti-rotation is obtained by producing the seat post body 20 and the high end portion 15 of the seat tube 10 with non-circular transverse sections.

According to a second aspect of the invention, the seat tube 10 also includes an attachment device that is capable of locking the seat post body 20 on the inside in the area of the high end portion 15.

Before going into more detail about the possible embodiments of such an attachment device, it should be noted at this stage of the description that the adjustment of the height of the saddle 21 is no longer performed here by cutting the seat tube, but rather by cutting the lower extremity of the seat post body 20. In the case of an irreversible error during cutting, it is thus considerably less expensive for the cyclist to purchase a seat post rather than to change the bicycle frame in its entirety. A joint cover 17 may be provided advantageously in the area of the zone of transition between the seat tube 10 and the high end portion 15 in order to conceal any chipping on the paintwork which may be caused by the recutting of the seat post body and to give a better finish. This joint cover 17 is intended to fit, for example, on the high end portion 15 of the seat tube 10, and to enclose the abutment 16 in the area of the transition zone.

Fine adjustment of the height of the saddle may be obtained by providing a set of interchangeable spacers 23, preferably having different heights, which the cyclist may stack between the seat post body 20 and the attachment device 22 for the saddle 21. Preferably at least one of these spacers 23 is made from an elastic material, for example an elastomer, so as to absorb the vibrations of the road. The spacers have heights in the order of a millimeter in order to permit the cyclist to adjust the height of the saddle according to the thickness of the soles of his shoes and/or the thickness of his shorts, as appropriate.

The invention also permits the reduction of the length of the seat tube 10 above the node of the saddle to an equal height with the high end portion 15 that is necessary for the effective retention of the saddle assembly. The component parts of the bicycle, in particular the frame 1, may thus be transported much more easily.

A first embodiment of an attachment device permitting the seat post 2 to be attached to the bicycle frame 1 on the inside, according to the invention, will now be described with reference to FIGS. 3 to 5:

Here, the attachment device includes a tangent buffer 4 capable of displacement along an endless screw 5 passing through a thread 40 provided on the tangent buffer 4. The tangent buffer 4 is retained in a laterally open slot 18 provided at the rear of the high end portion 15 of the seat tube 10, the said slot 18 being configured to receive longitudinally the part of the buffer 4 carrying the thread 40. The displacement of the tangent buffer is guided by a slide 19 positioned to the rear of the high end portion 15. A nut 6 is fitted at the extremity of the screw 5 above the high end portion 15 of the seat tube 10 and serves as an abutment in order to prevent the loss of the screw 5. In order to permit the screw 5 to turn, the nut 5 is fitted tightened onto the inner ring of a ball bearing 7 provided in a housing of the high end portion 15 of the seat tube. A washer 8 is interposed between the head of the screw 5 and the external surface of the seat tube 10. When the screw 5 is tightened by a suitable tool from the rear of the seat tube 10, the tangent buffer 4 is displaced towards the bottom along the slide 19 until it comes into contact with the internal wall of the seat post body 20, and until it forms a wedge between the high end portion 15 of the seat tube 10 and the interior of the body 20 of the seat post 2. The seat post 2 is thus tightened from the interior. As can be seen in FIG. 1, a protective cap 9 may be attached advantageously to the rear of the seat tube 10 in order to conceal the head of the screw 5 and to impart continuity to the external surfaces.

Figure 6:
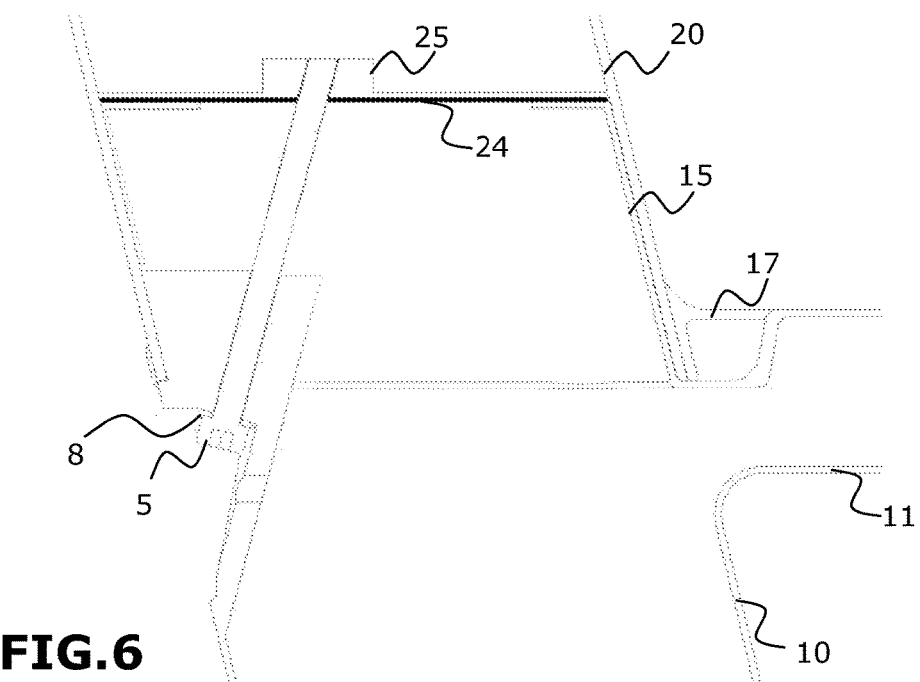
FIG. 6 is a partial view in lateral cross section of the joint of a seat post and a bicycle frame according to another possible mode of attachment, according to the invention.

FIG. 6 illustrates an attachment device permitting locking on the inside according to another embodiment:

Here, an elastomer 24 is provided between a plate 25 which extends transversely to the interior of the body 20 of the seat post and the upper part of the high end portion 15 of the seat tube 10. The screw 5, which is mounted in such a way as to pass through the elastomer 24 and a thread in the plate 25, is utilized here to bring the plate 25 closer to the elastomer 24, which is inflated by compression and squeezes the seat post body 20 on the inside.

The invention claimed is:

1. A frame for a bicycle, comprising:
   a seat tube comprising a tapered high end portion and
   a hollow seat post body,
   wherein said tapered high end portion of said seat tube is inserted into the inside of said hollow seat post body
   wherein the seat tube includes an attachment device that is accessible from the outside of said seat tube and extends upward through an inner part of the high end portion of said seat tube and into the attached hollow seat post body, locking the hollow seat post body from an inside of said hollow seat post body near said tapered high end portion of said seat tube where said hollow seat post body overlaps said seat post body,
   wherein said attachment device does not extend through to the outside surface of said hollow seat post body.

2. The frame for a bicycle according to claim 1, further comprising means for retaining the seat post body including an abutment that cooperates with an abutment surface of the seat post body in order to delimit a length of insertion of the high end portion into the seat post body.

3. The frame for a bicycle according to claim 2, wherein the abutment is formed by an annular shoulder extending transversely to a longitudinal axis of the seat tube in a junction area between the seat tube and the high end portion, which the annular shoulder abuts against a lower extremity of the seat post body.

4. The frame for a bicycle according to claim 3, further comprising a top tube connecting the seat tube to a head tube, wherein the annular shoulder forming the abutment is positioned at a base of the high end portion, substantially as an extension of a longitudinal axis of the top tube.

5. The frame for a bicycle according to claim 1, wherein the seat tube is dimensioned in cross section so that an external surface constitutes a continuation of an external surface of the seat post body.

6. The frame for a bicycle according to claim 1, wherein the attachment device includes a screw, a head of which is accessible from an exterior of the seat tube, and a tangent buffer forming a wedge between the high end portion of the seat tube and an interior of the seat post body when the screw is tightened.

7. The frame for a bicycle according to claim 6, further comprising a protective cap attached to a rear of the seat tube that conceals the head of the screw.

8. The frame for a bicycle according to claim 1, wherein the attachment device includes a screw, a head of which is accessible from an exterior of the seat tube, and an elastomer between a plate extending transversely to an interior of the seat post body and an upper part of the high end portion of the seat tube.

9. The frame for a bicycle according to claim 8, further comprising a protective cap attached to a rear of the seat tube concealing the head of the screw.

10. The frame for a bicycle according to claim 1, further comprising a joint cover that covers a zone of transition between the seat tube and the high end portion.

\* \* \* \* \*